United States Patent
Fujiwara et al.

(10) Patent No.: US 7,113,158 B1
(45) Date of Patent: Sep. 26, 2006

(54) IMAGE DISPLAY APPARATUS

(75) Inventors: Kouji Fujiwara, Tenri (JP); Tomohiko Yamamoto, Nara (JP); Keiichi Tanaka, Tenri (JP); Naoto Inoue, Nara (JP); Hideki Ichioka, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/668,071

(22) Filed: Sep. 22, 2000

(30) Foreign Application Priority Data

Sep. 22, 1999 (JP) .............................. 11-269142
Jun. 23, 2000 (JP) .............................. 2000-190202

(51) Int. Cl.
G09G 3/36 (2006.01)
G09G 3/34 (2006.01)

(52) U.S. Cl. .................. 345/87; 345/102; 345/108; 345/109

(58) Field of Classification Search .................. 345/87, 345/102, 213, 48–57, 108–110, 64, 4–6, 204, 345/44, 84; 349/61–66, 67
See application file for complete search history.

(56) References Cited

U.S. PATENT DOCUMENTS 4,641,157 A * 2/1987 Aoi
5,654,756 A * 8/1997 Takahashi et al.
5,742,367 A * 4/1998 Kozaki
5,825,347 A * 10/1998 Prinsen
5,828,427 A * 10/1998 Faris
5,880,704 A * 3/1999 Takezaki
6,023,255 A * 2/2000 Bell
6,094,216 A * 7/2000 Taniguchi et al. ............ 348/51

FOREIGN PATENT DOCUMENTS

JP          64-82019          3/1989
JP          11-109921         4/1999
JP          2002-006815       1/2002

OTHER PUBLICATIONS ("Guide to X386/XFree86 Video Timing", Section "How Video Display Works", http://www.unipaderborn.de/mirrors/xfree86/3.1.2/VideoModes.html#toc, Version 1.0, Jan. 8, 1993.*

* cited by examiner

Primary Examiner—Kee M. Tung
Assistant Examiner—Hau Nguyen
(74) Attorney, Agent, or Firm—David G. Conlin; John J. Penny, Jr.; Edwards Angell Palmer & Dodge LLP

(57) ABSTRACT

An image display apparatus comprising an image display device, a shield member, and a drive mechanism. The drive mechanism drives the shield member in synchronization with display of the image.

5 Claims, 10 Drawing Sheets

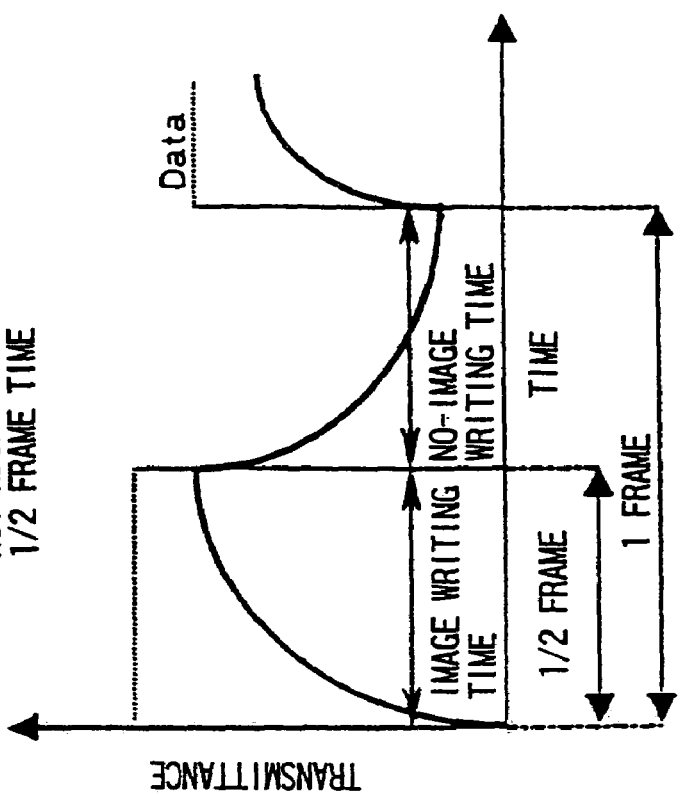
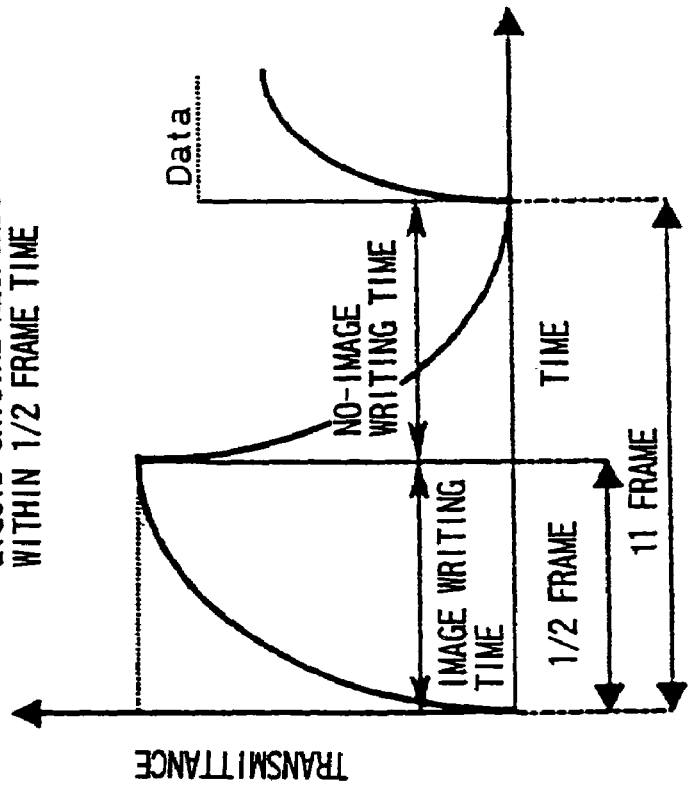

IMAGE DISPLAY APPARATUS

BACKGROUND OF THE INVENTION

1. Field of the Invention

The present invention relates to an image display apparatus for dealing with moving-images, and in particular, for example, to an active matrix drive type of liquid crystal display device.

2. Description of the Related Art

Hitherto liquid crystal displays (hereinafter simply referred to as "LCDs") have been used widely for various displays in clocks, pocket calculators, word processors, personal computers, navigation systems, etc. by utilizing their features, i.e., low profile, light weight, low power consumption, etc. Before the wide use of the LCDs, cathode ray tubes (hereinafter simply referred to as "CRTs") were used widely. In comparison with the CRTs, the LCDs have the advantages of having a greatly reduced thickness (depth) and requiring lower power consumption. Furthermore, in comparison with electro-luminescence (EL) devices, plasma display panel (PDP) devices and the like, the LCDs have the advantages of being able to be driven electrically and to attain full color display easily. By making full use of such advantages, the LCDs have been demanded in the fields related to moving-images, for example, personal computers, various monitors, portable television sets, digital video cameras, etc. In accordance with this trend, the LCDs are requested more and more to have higher moving-image performance. However, as yet the display performance of the LCD is far behind that of the CRT in the moving-image performance.

A first factor for making the moving-image performance of the LCD lower than that of the CRT is that the electro-optic response characteristic of its liquid crystal is low, that is, the time response characteristic of the transmittance of the liquid crystal is low. The time response characteristic of the transmittance is hereinafter referred to as "response speed." The LCDs put into actual use at present are categorized into a twisted nematic type, simply referred to as TN, and a super-twisted nematic type, simply referred to as STN. The response speed of the STN type is about hundred milliseconds. Even the TN type has a low response speed of several tens of milliseconds. Therefore, the response of the liquid crystal is not completed within one frame time of 16.7 ms which is an image information rewriting time in the case of 60 frames per second. In other words, since the response speed of the liquid crystal is low, several frames time is required until the response of the liquid crystal is completed. Therefore, even if image signal rewriting is carried out, images for plural frames are mixed in an image, thereby causing a blurred image. However, in recent years, a liquid crystal capable of responding within one frame time, that is, 16.7 ms, has been developed. It is shown from a moving-image performance test of such a liquid crystal having such a high response speed that an image obtained using the liquid crystal are improved with respect to blurs in comparison with an image obtained by using the TN liquid crystal. However, it is found that the image quality is lower than that of the CRT in sharpness.

Because of the above-mentioned reasons, it is found that, in addition to the response speed of the liquid crystal, there are decisive reasons why the moving-image performance of the LCD is lower than that of the CRT. As for the causes of the low performance, the reports by IBM and NHK point out that the drive system of the LCD differs from that of the CRT. This will be described below.

As described above, even if a liquid crystal having a response speed sufficiently lower than one frame time, the LCD cannot obtain the moving-image performance equivalent to that of the CRT. To clarify this phenomenon, the CRT and the LCD are considered below in view of a light-emitting mode. The CRT is a display device wherein the phosphor at the portion hit by the scanning electron beam emits light momentarily. Therefore, the CRT is a display apparatus of the impulse light-emitting type wherein light is emitted from the phosphor during only part of one frame time. On the other hand, the LCD, the active-matrix type LCD comprising thin-film transistors (TFTs) in particular, is a hold-type display device that keeps holding an image at each pixel until the next rewriting and is continuously illuminated by a back-light or the like.

FIG. 12A shows a change in the light emission intensity of a typical CRT of the impulse light-emitting type with respect to time, and FIG. 12B shows a change in the transmittance of a typical LCD of the active matrix transmission type as a hold-type light-emitting display apparatus. It is believed that this difference in the light-emitting mode makes the moving-image performance of the LCD lower than that of the CRT. In reality, if the LCD is driven in the impulse light-emitting mode, its moving-image performance is improved significantly according to the results of experiments. Therefore, in order to obtain moving-image performance equivalent to that of the CRT, it is found that the LCD must be driven by the impulse-type drive used for the light-emitting mode of the CRT as shown in FIG. 12A, instead of the hold-type drive in the conventional continuous light emission as shown in FIG. 12B.

As a method of carrying out the impulse-type drive to improve the moving-image performance of the LCD, methods proposed in Japanese Unexamined Patent Publication JP-A 64-82019 (1989) and Japanese Unexamined Patent Publication JP-A 11-109921 (1999) are available for example. JP-A 64-82019 proposes a method of intermittently lighting a back-light in synchronization with frame cycles. In this prior art, the back-light of a transmission-type liquid crystal display panel is divided into plural back-light portions capable of being turned on and off selectively, and the divided back-light portions are turned on and off sequentially in synchronization with the drive timing of the scanning electrodes of the liquid crystal display panel to display moving-images. Each back-light portion is turned on immediately after all the image scanning electrodes in the illumination range corresponding thereto are selected, and is turned off in the other periods. As described above, even in the LCD, the impulse-type drive can be carried out by performing image display in only a desired period and by forcibly attaining a non-image state in the other periods. As a result, it is possible to prevent an image from being seen mixed with images for other continuous frames in one screen at a time. Therefore, it is possible to improve the quality and moving-image performance of displayed images.

However, in the above-mentioned method, the non-image state can be controlled only for each back-light portion. Therefore, optimum timing cannot be set for each scanning line. In other words, even if lighting is carrying out at optimum timing for a certain scanning line, the timing is not necessarily optimal for other scanning lines. Furthermore, when the back-light is turned on and off, the optical characteristics of the back-light, that is, the light emission and persistence characteristics thereof, cause problems. The phosphor components included in the back-light are three primary colors, i.e., R, G and B. If the optical characteristics of these three kinds of phosphors are identical with one another in rising and decaying for example, no problem occurs. However, in reality, the optical characteristics of R, G and B are different from one another. As a result, when the back-light is turned on and off, if the persistence characteristic of a color, for example, green, is longer than those of the other colors, coloring (green coloring in this case) occurs. In other words, the quality of display is lowered, although moving-image performance can be improved.

JP-A 11-109921 discloses a method of improving moving-image performance by attaining impulse-type drive while the back-light is always lit, without carrying out the above-mentioned back-light on/off drive. Hereafter, the state wherein the back-light is always lit is referred to as a "continuous light-emitting mode." In the above-mentioned JP-A 64-82019, the non-image display state is attained by turning off the back-light. On the other hand, JP-A11-109921 discloses a method of attaining the non-image display state by writing a black display signal for example for a constant period after an image is displayed on the liquid crystal display panel. In other words, instead of intermittently turning on the back-light, an image is displayed, and then a non-image used to erase the image once is displayed, thereby attaining impulse-type drive. With this method, impulse-type drive can be carried out while the back-light is always lit. Therefore, impulse-type drive can be carried out while eliminating the disadvantages of the back-light on/off drive.

However, the method of attaining the impulse-type drive by using the non-image state also has a problem, because this method is characterized in that within one frame time an image is displayed and a non-image is also displayed. In other words, two screens must be displayed within one frame time. Therefore, the liquid crystal is required to respond within ½ frame time, and the panel including its drive circuit is required to have double-speed writing design wherein a signal is written within ½ frame time.

FIG. 13A and FIG. 13B show response characteristics in the case where double-speed writing is performed within ½ frame time. FIG. 13A shows a case wherein the liquid crystal responds within ½ frame time. One frame time is halved into an image signal writing time and a non-image signal writing time to attain impulse-type drive. However, in reality, it is very difficult to raise the response speed of the liquid crystal. If this drive is carried out while the response speed of the liquid crystal is insufficient, the charging for image display becomes insufficient as shown in FIG. 13B, and the charging for non-image display also becomes insufficient. Therefore, the moving-image performance is not improved, and the problem of low constant also occurs.

FIG. 14A and FIG. 14B show changes in the case where the image signal writing time is changed and in the case where the non-image signal writing time is changed, respectively. FIG. 14A shows a state wherein the image signal writing time is increased so that an image can be written sufficiently. Since the non-image signal writing time is shortened, only insufficient non-image signal writing can be carried out. As a result, as shown in the figure, complete blackening is not attained, and moving-image performance is lowered. On the other hand, if the non-image signal writing time is extended as shown in FIG. 14B, the image signal writing time is shortened, and image display having sufficient constant cannot be carried out.

As described above, in the case where LCD is driven in a hold-type drive method to display moving-images, the following problems must be solved.

1) Impulse-type drive must be carried out to improve the LCD so as to have a moving-image performance as equal as that of the CRT.

2) The impulse-type drive by turning on and off the back-light causes no contrast reduction, however, a) lighting timing is different among positions of the display area, whereby the moving-image performance cannot be improved uniformly in the display area, and b) respective optical characteristics such as light emission and persistence characteristics of the back-light phosphors are different among the three primary colors, i.e., R, G and B, at the current state, whereby the display on the display panel is colored.

3) In the hold-type drive the back-light is continuously in on-state (continuous light-emitting mode). Accordingly, if double-speed writing is carried out in which image signal writing and non-image signal writing thereafter is carried out within one frame cycle, moving-image performance can be improved uniformly in the display area, thereby no undesired coloring of the panel occurs in displaying an image, however, it is difficult at the present state of art that the liquid crystal responds to the signal within ½ frame time. In the case where the liquid crystal does not respond within ½ frame time and therefore the ratio of the image signal writing time is increased, the non-image signal writing time is shortened and as a result the non-image signal is not written completely, whereby moving-image performance is not improved. Needless to say, the ratio of the non-image signal writing time is increased and the image signal writing time is shortened, the image signal is not written completely, whereby only insufficient image display is performed, whereby the contrast of the displayed image is lowered.

SUMMARY

An object of the invention is to provide an image display apparatus capable of obtaining proper moving-image performance without causing image contrast reduction.

The invention relates to an image display apparatus comprising:

an image display device driven in a continuous light-emitting mode, for displaying an image;

a shield member capable of shutting off an image displayed by the image display device, for a constant period; and a drive mechanism for driving the shield member in synchronization of display of the image by the image display device.

In accordance with the invention, the image display device carries out the display of continuous images every frame time, and the drive mechanism drives the shield member to shut off an image displayed in an interval between frames. Therefore, images displayed in intervals between continuous frames can be shut off even in the case of an image display device that is driven by a hold-type drive, whereby substantial impulse-type drive can be attained and moving-image display performance can be improved. Since it is not necessary to carry out image display in one half of one frame time, contrast reduction can be avoided even if an image display device having a relatively low speed is used.

Furthermore, in the invention it is preferable that the image display device is a transmission-type liquid crystal panel, and the shield member mechanically intercepts back light applied to the transmission-type liquid crystal panel for a constant period.

In accordance with the invention, at the time of irradiating the transmission-type liquid crystal panel with light from a back-light, the light can be intercepted by the shield member. Therefore, substantial impulse-type drive can be carried out for the transmission-type liquid crystal panel while the back-light is always in on state. Since on-off operation of the back-light is not carried out, color displacements and the like owing to the on/off operation of the back-light can be prevented.

Furthermore, in the invention it is preferable that the image display device is a transmission-type liquid crystal panel, and the shield member mechanically intercepts light transmitted from the transmission-type liquid crystal panel for a constant period.

In accordance with the invention, the shield member can intercept the light which is emitted from the back-light and passed through the transmission-type liquid crystal panel, for a constant period. Therefore, the back-light can always be in on state, and color displacements and the like owing to the on/off operation of the back-light can be prevented.

Furthermore, in the invention it is preferable that the image display device is a reflection-type liquid crystal panel, and the shield member mechanically intercepts light reflected from the reflection-type liquid crystal panel for a constant period.

In accordance with the invention, the shield member can intercept the light reflected from the reflection-type liquid crystal device for a constant period. Therefore, even when the reflection-type liquid crystal device is driven by hold-type drive, its display can be carried out by impulse-type drive. Therefore, the quality of displayed moving-images can be improved.

Furthermore, in the invention it is preferable that the shield member is an endless belt comprising light transmitting portions and light intercepting portions, which are alternately disposed.

In accordance with the invention, the endless belt comprising the light transmitting portions and light intercepting portions which are alternately disposed is used. Therefore, light transmission and interception can be switched easily, and continuous image display can be attained mechanically just as in the case of impulse-type drive.

Furthermore, in the invention it is preferable that the image display device is a liquid crystal projection device for magnifying and projecting light transmitted by the transmission-type liquid crystal panel, and the shield member collects back light and changes a irradiation position of the back light so as to be moved away from the transmission-type liquid crystal panel, to mechanically shut off irradiation of the back light for a constant period.

In accordance with the invention, the irradiation efficiency of the back light applied to the transmission-type liquid crystal panel is raised, and the transmitted light is magnified and projected. Therefore, moving-images can be formed on a large projection screen and the like just as in the case of impulse-type drive.

Furthermore, in the invention it is preferable that the image display device carries out image display in synchronization with a vertical sync signal having a constant cycle, and the drive mechanism drives the shield member in synchronization with the vertical sync signal to carry out the interception for the constant period.

In accordance with the invention, the interception for impulse-type drive is carried out in synchronization with the vertical sync signal representing the start of frames continuing in a constant cycle. Therefore, moving-images can be displayed properly.

Furthermore, in the invention it is preferable that the shield member comprises a liquid crystal optical shutter comprising a liquid crystal having a high response speed characteristic.

In accordance with the invention, the shield member comprises the liquid crystal optical shutter formed of a liquid crystal having a high response speed, such as ferroelectric or antiferroelectric liquid crystals. No rotation mechanism is required for the light interception mechanism. Therefore, impulse-type drive can be attained by using a very simple configuration. In addition, since no rotation mechanism is required as described above, noise owing to rotation does not occur. Furthermore, since deterioration and the like in a rotation mechanism do not occur, the quality of display can be improved. Moreover, the drive timing of the liquid crystal panel and the non-image selection ratio can be changed digitally.

BRIEF DESCRIPTION OF THE DRAWINGS

Other and further objects, features, and advantages of the invention will be more explicit from the following detailed description taken with reference to the drawings wherein:

FIG. 13A and FIG. 13B are graphs provided for comparison of changes in transmittance in the case where a liquid crystal responds within ½ frame time and in the case where a liquid crystal does not respond within ½ frame time at the time when image signal writing and non-image signal writing are carried out within one frame time.

DETAILED DESCRIPTION OF THE PREFERRED EMBODIMENTS

Figure 1:
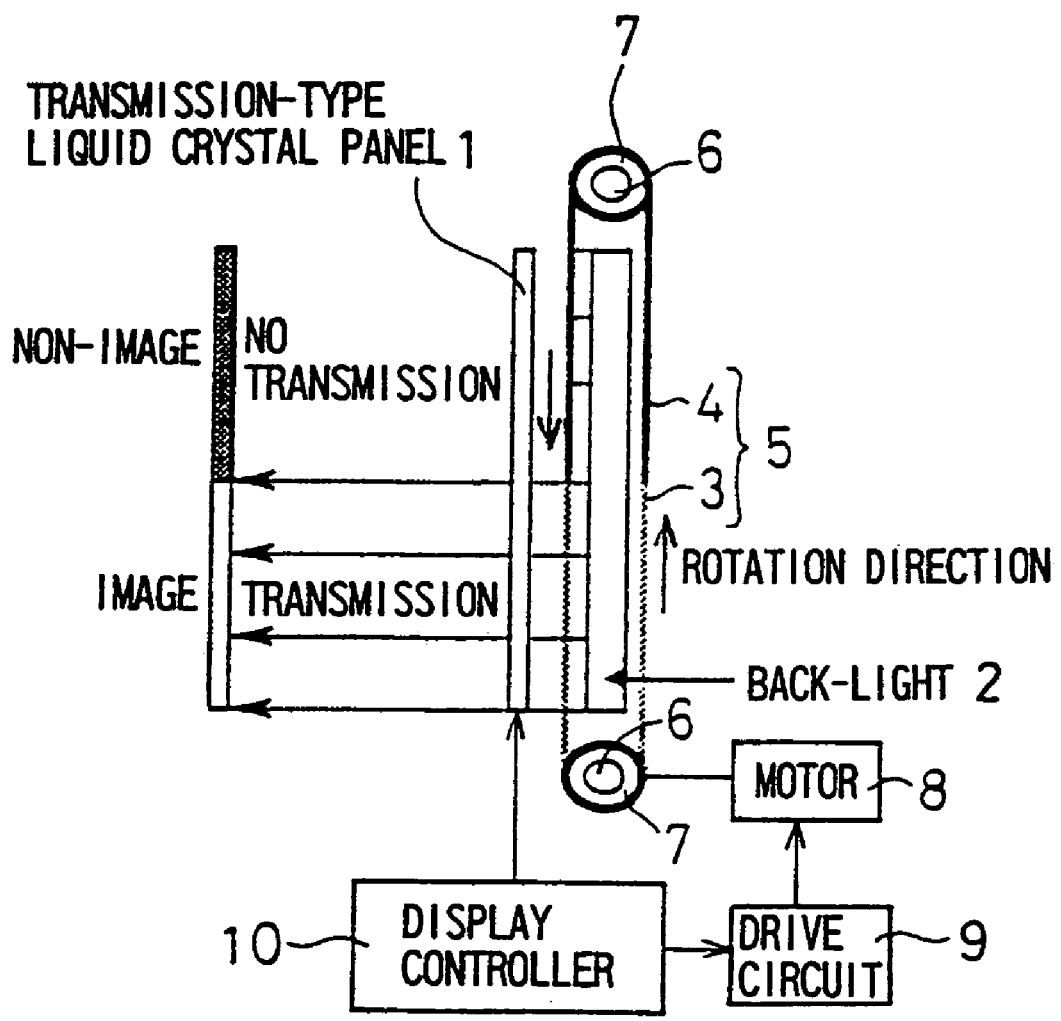
FIG. 1 is a simplified sectional view showing a general configuration of an image display apparatus in accordance with a first embodiment of the invention.

Now referring to the drawings, preferred embodiments of the invention are described below.

FIG. 1 is a general configuration of an LCD in accordance with a first embodiment of the invention. In other embodiments, the same reference codes are used to designate portions corresponding to those of the present embodiment, and overlapping descriptions are omitted. In the image display apparatus of the present embodiment, a transmission-type liquid-crystal panel 1 changes the transmittance at each pixel, and carries out image display by using the light from a back-light 2. The back-light 2 is disposed inside a mechanism wherein an endless belt 5 comprising light transmitting films 3 and light intercepting films 4 which are bonded alternately is routed between rollers 7 rotatable around the axes of a pair of rotation shafts 6. When one of the rotation shafts 6 is rotated at a constant speed, the rotation drive power is transmitted from the roller 7 to the belt 5, and the belt 5 moves linearly as indicated by arrows.

The belt 5 comprises a light transmitting portion formed of the light transmitting film 3 and a light intercepting portion formed of the light intercepting film 4. This belt 5 functions as a shield member. The motor 8 for rotating one of the rotation shafts 6 is driven by a drive circuit 9. The input of an image signal to the transmission-type liquid crystal panel 1 and the drive timing of the drive circuit 9 are adjusted by a display controller 10. The display controller 10 can display different images in a constant cycle, for example, 60 cycles per second. In other words, 60 frames of moving-images can be displayed in one second. The drive circuit 9 drives the motor 8 so that the light intercepting film 4 intercepts the light applied from the back-light 2 to the transmission-type liquid-crystal panel 1 for a constant time in synchronization with the vertical sync signal representing the start of the frame time of a moving-image. Although the configuration for driving the belt 5 is also used for the following embodiments in the same way, the explanation of the configuration is omitted from the descriptions of the embodiments.

FIGS. 2A to 2D show states wherein the impulse-type drive for the transmission-type liquid crystal panel 1 is attained by the belt 5 as shown in FIG. 1. In other words, as shown in FIG. 2A, when carrying out image display using the transmission-type liquid crystal panel 1 as shown in FIG. 2A, the light transmitting film 3 is disposed so that the entire rear face of the transmission-type liquid crystal panel 1 is irradiated with the back-light 2. FIG. 2B shows a state wherein the light transmitting film 3 is being moved away from the rear face side of the transmission-type liquid crystal panel 1 and the light intercepting film 4 is being positioned on the rear face side of the transmission-type liquid crystal panel 1 by the drive of the motor 8. When the light from the back-light 2 is intercepted by the light intercepting film 4 and the entire face on the rear face side of the transmission-type liquid crystal panel 1 is not irradiated with the light as shown in FIG. 2C, a no-image display state is obtained. When the light intercepting film 4 is moved away from the rear face side of the transmission-type liquid crystal panel 1 and the ratio of the light transmitting film 3 becomes higher as shown in FIG. 2D, the non-image display state is changed to an image display state. In the end, as shown in FIG. 2A, the rear face side of the transmission-type liquid crystal panel 1 is entirely irradiated by the light from the back-light 2, and the image display state is obtained. The states as shown in FIGS. 2A to 2D are repeated in one frame cycle hereafter. This prevents different continuous frames from being seen mixed in one screen at a certain time, and the moving-image performance can be improved.

Figure 3:
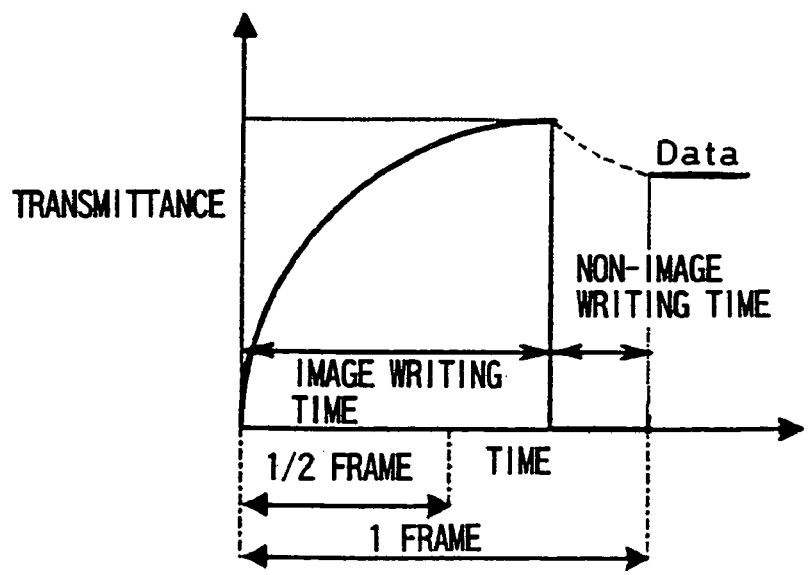
FIG. 3 is a graph showing a change in transmittance in the case where an image signal writing time is made longer than ½ frame time in a transmission-type liquid crystal panel 1.
Figure 14A:
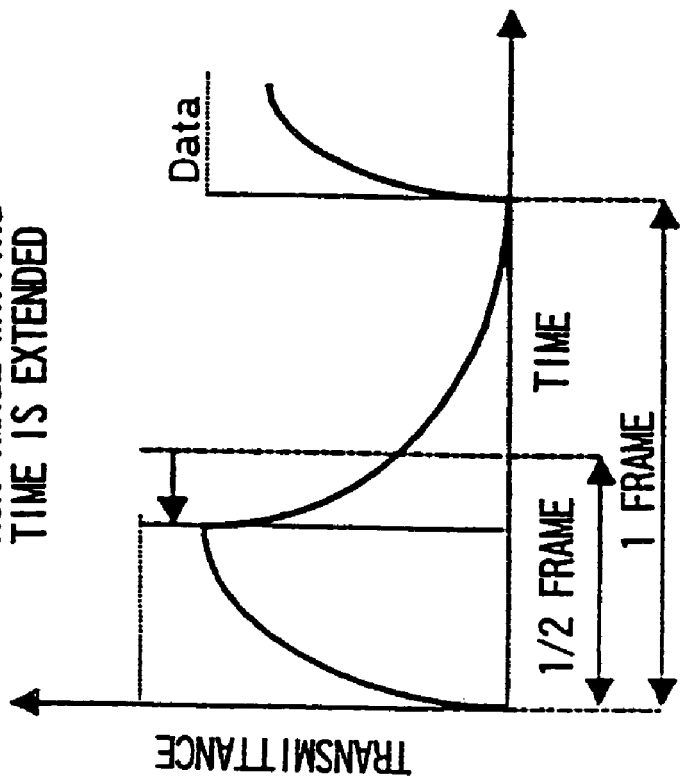
FIG. 14A and FIG. 14B are graphs provided for comparison of changes in transmittance in the case where an image signal writing time is extended and in the case where a non-image signal writing time is extended when a liquid crystal does not respond within ½ frame time.
Figure 14B:
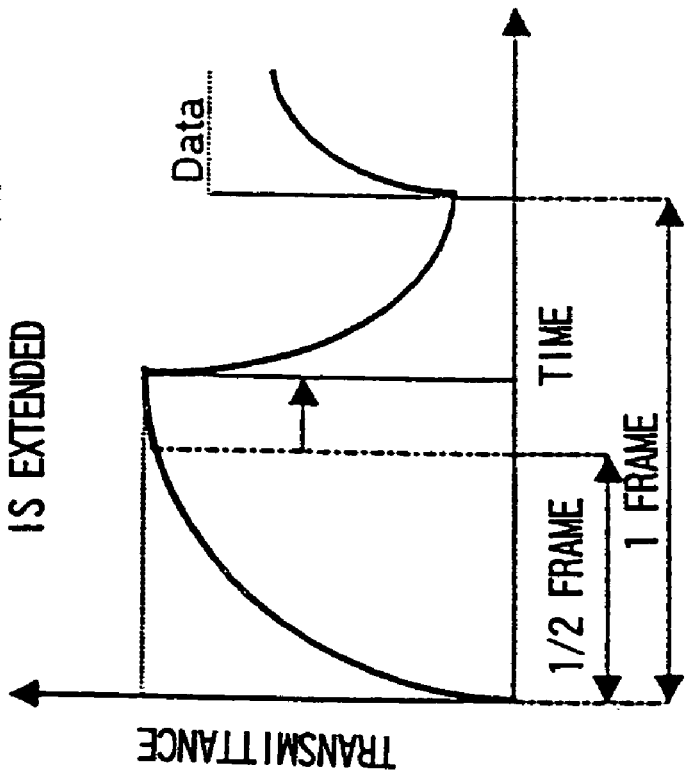

FIG. 3 shows a change in transmittance in the case where the image signal writing time is extended within one frame time and impulse-type drive is carried out. In the present embodiment, even when the image signal writing time is extended as shown in FIG. 14A, the non-image signal writing is not carried out actually in the non-image signal writing time. Therefore, even an LCD having a response speed lower than ½ frame time can display proper images. The non-display time can be changed as desired to some extent depending on the response time of the liquid crystal.

The image display in accordance with the present embodiment has the following advantages.

[1] Since the impulse-type drive can be attained for the transmission-type liquid crystal panel 1 while the back-light is always lit, it is possible to obtain uniform, colorless images in the display area.

[2] Since the light from the back-light 2 can be intercepted for a constant time by the belt 5 used as a shield member, complete impulse-type drive can be attained, and the moving-image performance can be improved significantly.

[3] In the case where the liquid crystal of the transmission-type liquid crystal panel 1 does not respond within ½ frame time or less, even when the image signal writing time is extended and an image signal is written, a non-image display state can be attained by mechanically intercepting the light. Therefore, insufficient charging does not occur at the time of writing a non-image signal on the liquid crystal panel. Consequently, it is possible to attain complete impulse-type drive.

[4] As the result of [3], it is possible to carry out image display with no contrast reduction.

Figure 4:
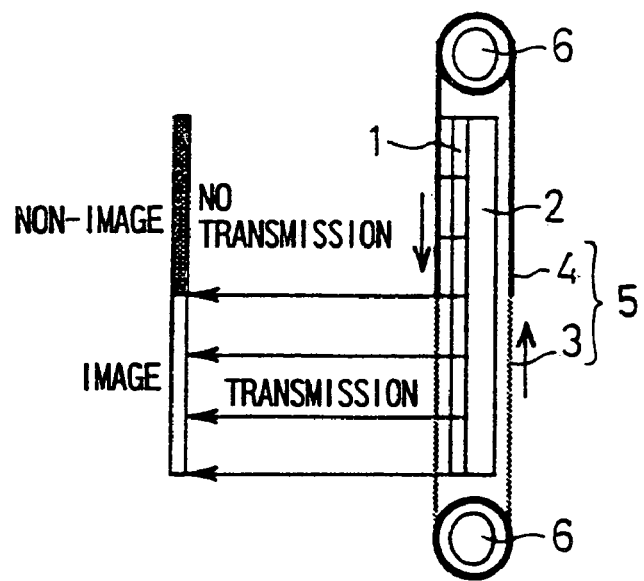
FIG. 4 is a simplified sectional view showing a general configuration of an image display apparatus in accordance with a second embodiment of the invention.

FIG. 4 is a general configuration of an image display apparatus in accordance with a second embodiment of the invention. In the present embodiment, a transmission-type liquid crystal panel 1 and a back-light 2 are integrated into a single unit. The transmitted light from the transmission-type liquid crystal panel 1 is mechanically intercepted by the light intercepting film 4 of a belt 5. Just as in the case of the first embodiment, in the present embodiment, the belt 5 comprises light transmitting films 3 and light intercepting films 4 which are bonded alternately. By traveling the belt 5 between rollers 7 by rotating their rotation shafts 6, the light intercepting film 4 intercepts the transmitted light from the transmission-type liquid crystal panel 1 for a constant period, thereby being capable of attaining impulse-type drive.

Since the transmission-type liquid crystal panel 1 and the back-light 2 are integrated into a single unit in the present embodiment, the liquid crystal apparatus of the present embodiment has an advantage in that the thickness of its module can be made smaller than that of the liquid crystal apparatus of the first embodiment.

Figure 5:
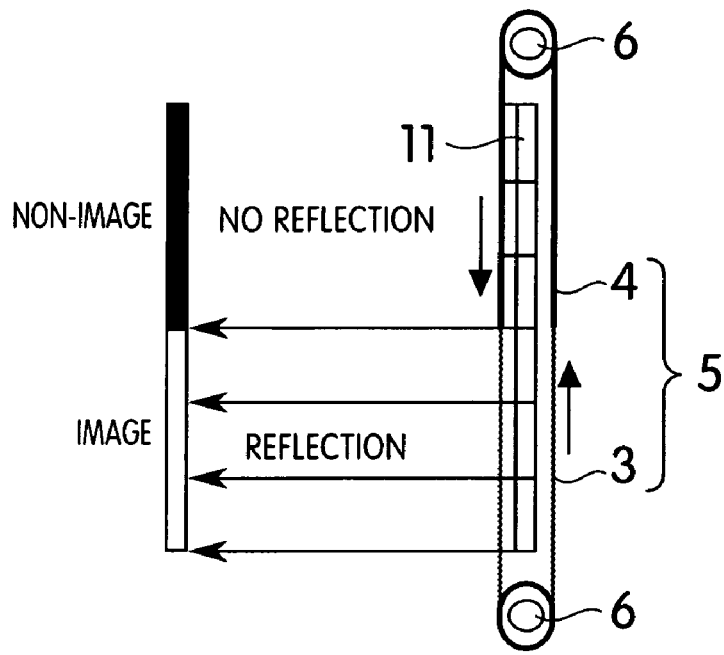
FIG. 5 is a simplified sectional view showing a general configuration of an image display apparatus in accordance with a third embodiment of the invention.

FIG. 5 is a general configuration of an image display apparatus in accordance with a third embodiment of the invention. In the present embodiment, the reflection light from a reflection-type liquid critical panel 11 is intercepted reflectively for a constant period by using a belt 5, thereby attaining impulse-type drive.

Figure 6:
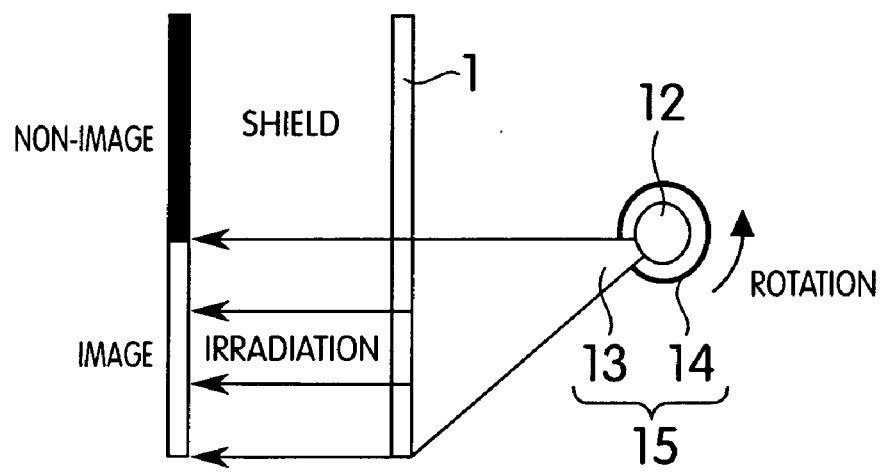
FIG. 6 is a simplified sectional view showing a general configuration of an image display apparatus in accordance with a fourth embodiment of the invention.

FIG. 6 is a general configuration of an image display apparatus in accordance with a fourth embodiment of the invention. In the present embodiment, when the rear face side of a transmission-type liquid crystal panel 1 is irradiated with a back-light 12, a reflection tube 15 comprising an opening portion 13 and a reflection portion 14 is disposed around the back-light 12 and the reflection tube 15 is rotated. Inside the reflection tube 15, the reflection portion 14 collects the light from the back-light 12, and the light is applied through the opening portion 13 to the outside. The light from the back-light 12 is applied to the transmission-type liquid crystal panel 1 when the opening portion 13 faces the rear face side of the transmission-type liquid crystal panel 1, and then the light is shielded for a constant period in accordance with the rotation of the reflection tube 15. Therefore, it is possible to attain impulse-type drive.

In the present embodiment, the light from the back-light 12 can be collected at the reflection portion 14 and applied through the opening portion 13 to the transmission-type liquid crystal panel 1 without being intercepted. Therefore, efficient irradiation can be attained, luminance can be raised, and the quality of display can be improved. The present embodiment can preferably be used for a liquid crystal projection display apparatus that magnifies transmitted light and performs projection on a screen or the like.

Figure 7:
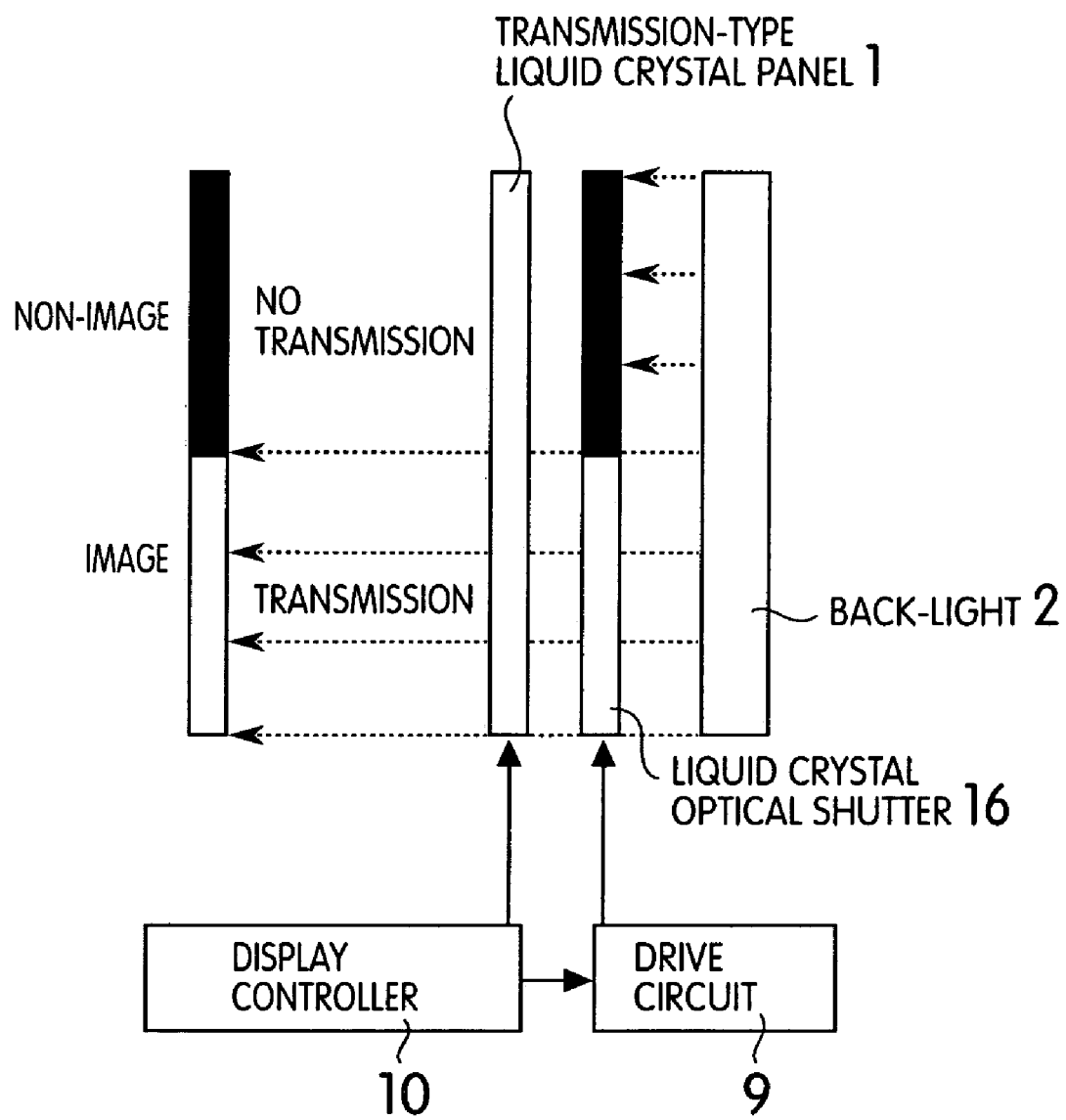
FIG. 7 is a simplified sectional view showing a general configuration of an image display apparatus in accordance with a fifth embodiment of the invention.

FIG. 7 is a simplified sectional view showing a general configuration of an image display apparatus in accordance with a fifth embodiment of the invention. In the above-mentioned first to fourth embodiments, the belt 5 or the reflection tube 15 is rotated mechanically to intercept light. However, in the present embodiment, a liquid crystal optical shutter 16 formed of a liquid crystal having a high-speed response characteristic, such as a ferroelectric liquid crystal or an antiferroelectric liquid crystal, is used to intercept light. Therefore, when light is applied from a back-light 2 to a transmission-type liquid crystal panel 1, this irradiation light is intercepted by the liquid crystal optical shutter 16 for a constant period. As a result, it is possible to attain impulse-type drive.

Figure 8:
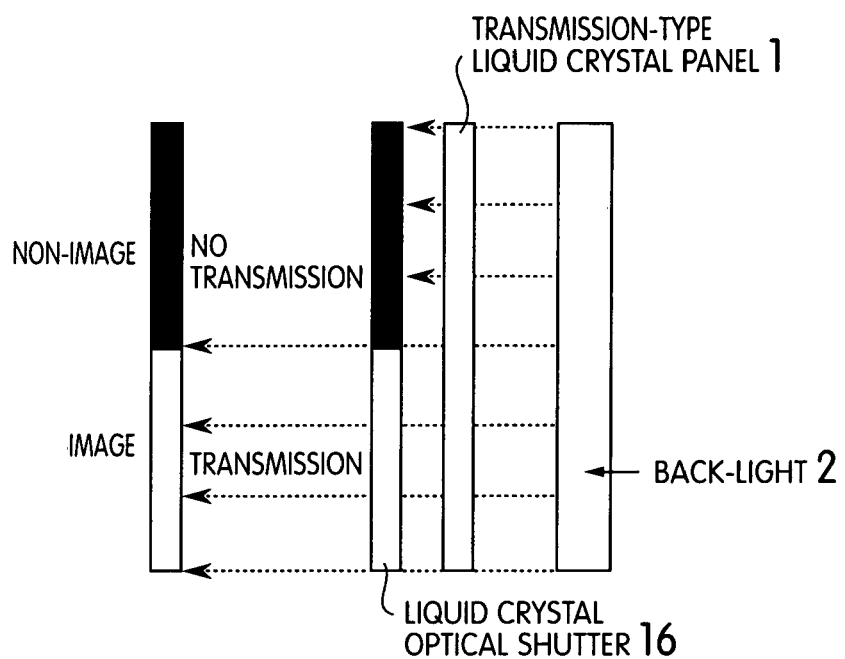
FIG. 8 is a simplified sectional view showing a general configuration of an image display apparatus in accordance with a sixth embodiment of the invention.
Figure 9:
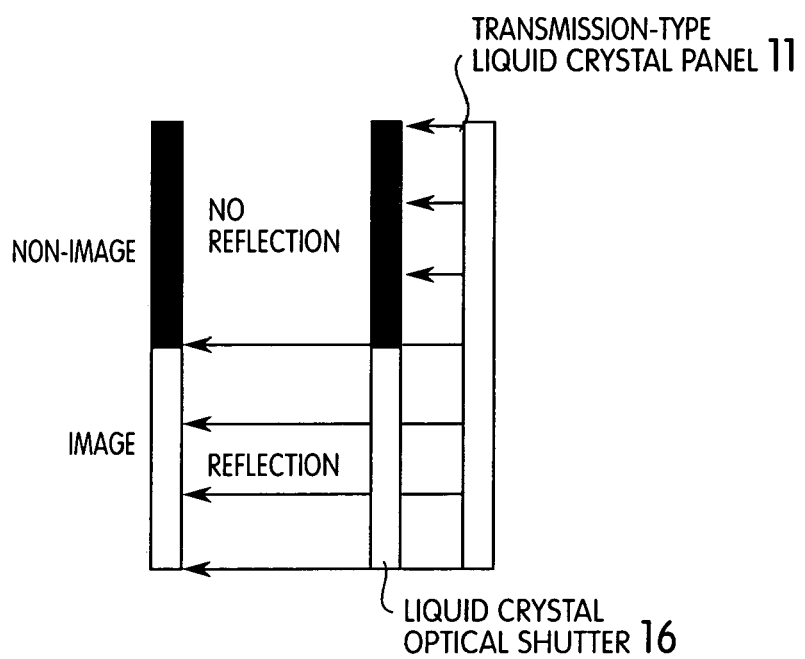
FIG. 9 is a simplified sectional view showing a general configuration of an image display apparatus in accordance with a seventh embodiment of the invention.
Figure 10:
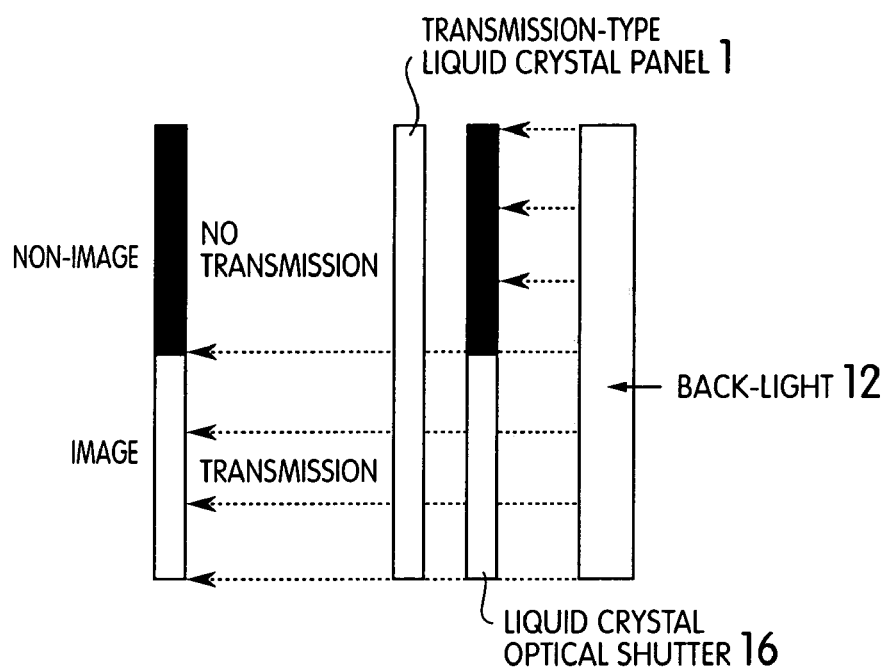
FIG. 10 is a simplified sectional view showing a general configuration of an image display apparatus in accordance with an eighth embodiment of the invention.

FIG. 8 is a simplified sectional view showing a general configuration of an image display apparatus in accordance with a sixth embodiment of the invention. FIG. 9 is a simplified sectional view showing a general configuration of an image display apparatus in accordance with a seventh embodiment of the invention. FIG. 10 is a simplified sectional view showing a general configuration of an image display apparatus in accordance with an eighth embodiment of the invention. In the above-mentioned fifth embodiment, the mechanism for intercepting the light applied to the transmission-type liquid crystal panel 1 is shown. However, the liquid crystal optical shutter 16 is used not only for this mechanism but also for a mechanism as shown in FIG. 8 for intercepting the display light from the transmission-type panel 1, a mechanism as shown in FIG. 9 for intercepting the reflected light of the reflection-type panel 11 or a mechanism shown in FIG. 10 for a projection panel. Therefore, the liquid crystal optical shutter 16 can be used for all liquid crystal panels of transmission, reflection and projection types.

Figure 2:
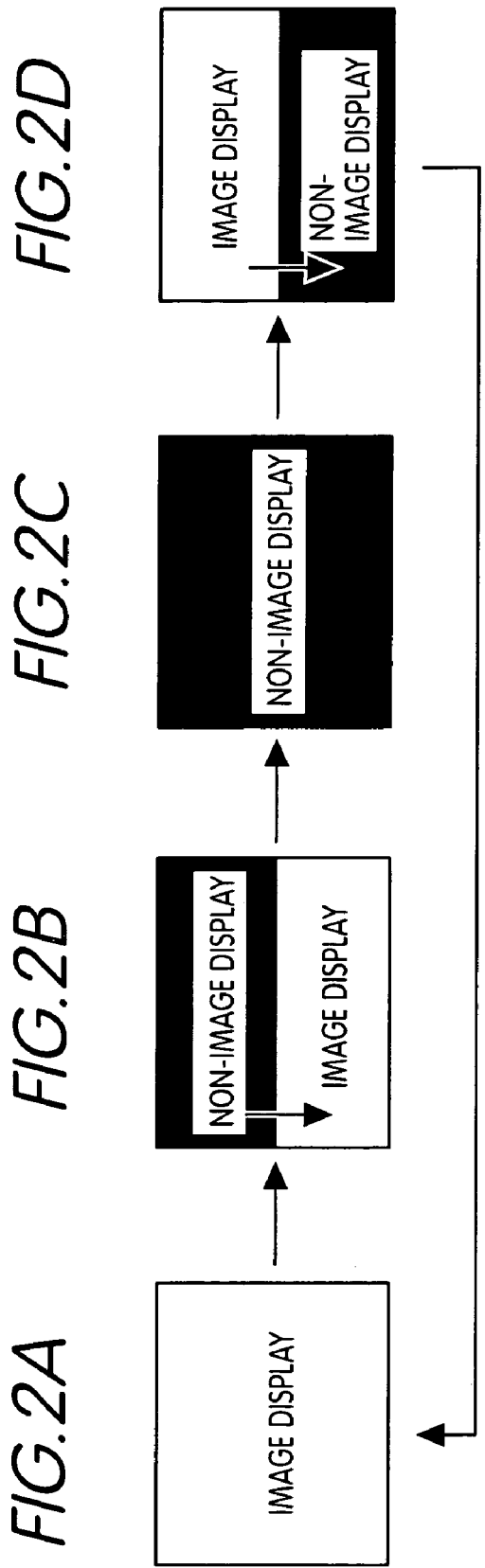
FIG. 2A to FIG. 2D are views showing states changed over between image display and non-image display in accordance with the embodiment of FIG. 1.
Figure 11:
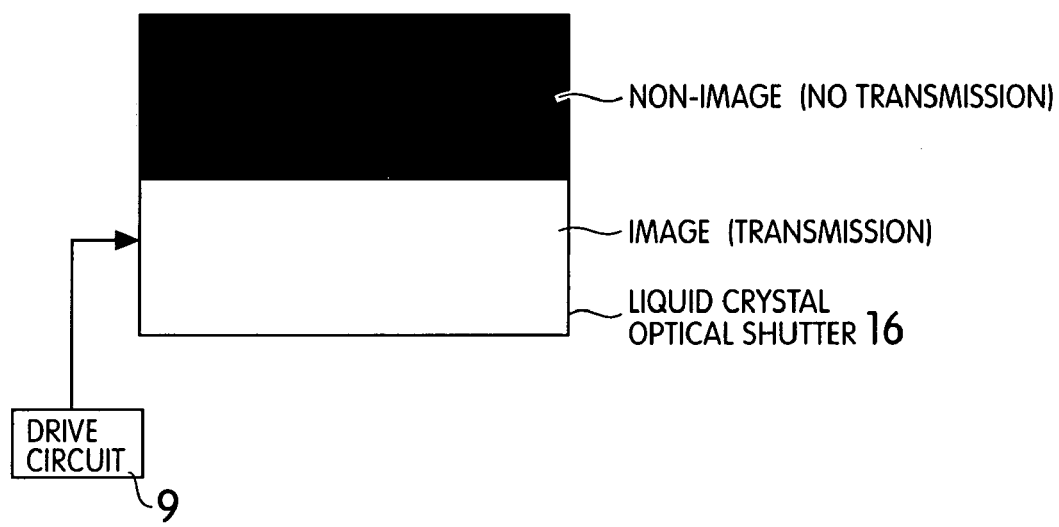
FIG. 11 is a view showing a liquid crystal optical shutter 16.
Figure 12B:
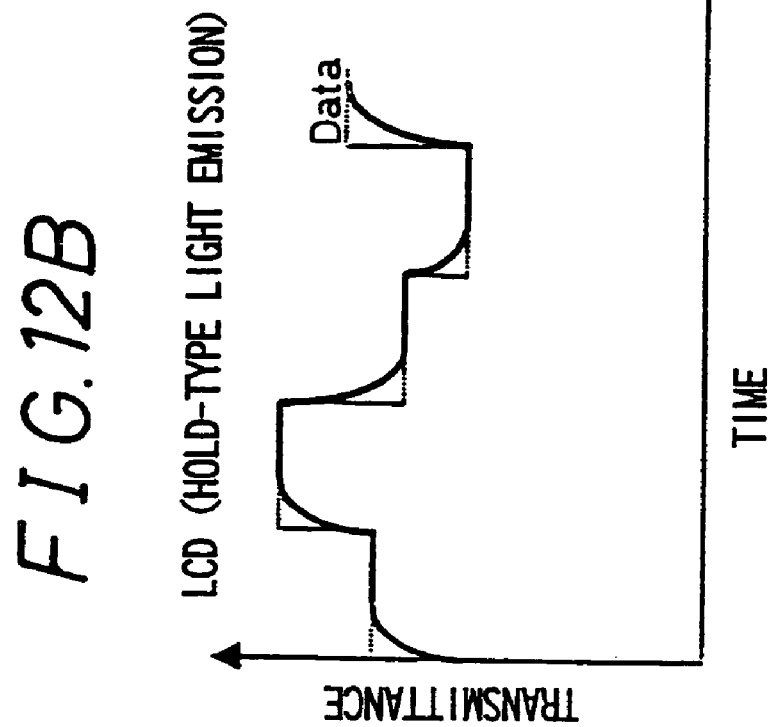
FIG. 12A and FIG. 12B are graphs provided for comparison of changes in light emission intensity in the impulse-type light-emitting mode of a CRT and in transmittance in the hold-type light-emitting mode of an LCD.
Figure 12A:
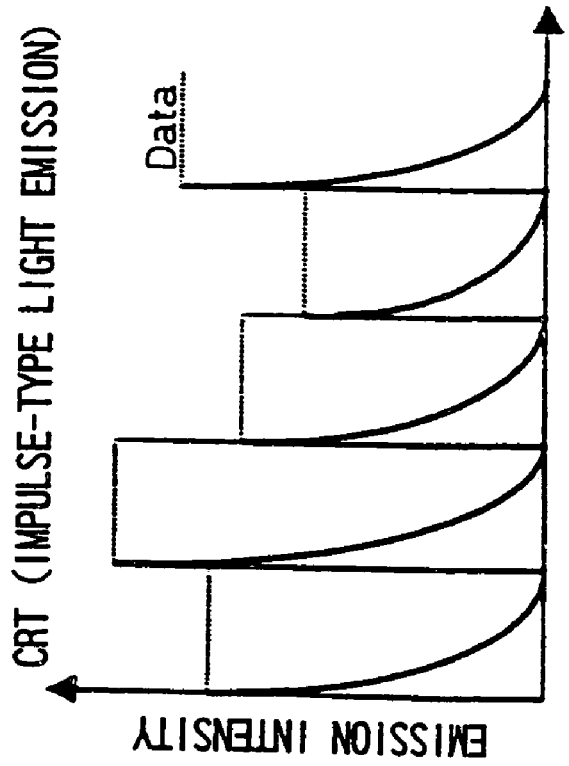

FIG. 11 is a view showing the liquid crystal optical shutter 16. Both the ferroelectric liquid crystal and the antiferroelectric liquid crystal have sufficiently high response speeds of several tens of microseconds and can function as optical shutters. By driving the liquid crystal optical shutter 16, in which a liquid crystal having such a high response speed is injected, in synchronization with the vertical sync signal of an image display panel (a transmission, reflection or projection type), light is intercepted in a constant cycle, thereby attaining impulse-type drive. In other words, the impulse-type drive as shown in FIG. 2 is attained by using the liquid crystal optical shutter 16. By carrying out drive in this way, no rotation mechanism is required, unlike the above-mentioned first to fourth embodiments. Therefore, noise owing to rotation does not occur. In addition, since deterioration in a rotation mechanism does not occur, the quality of display can be improved. Furthermore, the drive timing of the liquid crystal panel and the non-image selection ratio can be changed digitally.

Although the invention is applied to a TFT active matrix LCD used as an image display device in the above-mentioned embodiments, the invention can be applied to a passive matrix LCD in the same way to improve image quality at the time of displaying moving-images. Furthermore, the invention can also be applied to other display devices, such as electro-luminescence (EL) devices and plasma display panel (PDP) devices, different from LCDs, to improve moving-image performance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image display apparatus comprising:
    an image display device driven in a continuous light-emitting mode, for displaying an image;
    a shield member including a light transmitting portion and a light intercepting portion, capable of shutting off an image displayed by the image display device, for a constant period; and
    a driven mechanism for driving the shield member in synchronization with display of the image by the image display device so as to switch between the light transmitting portion and the light intercepting portion of the shield member, wherein the shield member is an endless belt comprising light transmitting portions and light intercepting portions, which are alternately disposed.

2. The image display apparatus of claim 1, wherein the image display device is a transmission-type liquid crystal panel, and
    the shield member mechanically intercepts back light applied to the transmission-type liquid crystal panel for a constant period.

3. The image display apparatus of claim 1, wherein the image display device is a transmission-type liquid crystal panel, and the shield member mechanically intercepts light transmitted from the transmission-type liquid crystal panel for a constant period.

4. The image display apparatus of claim 1, wherein the image display device is a reflection-type liquid crystal panel, and
    the shield member mechanically intercepts light reflected from the reflection-type liquid crystal panel for a constant period.

5. The image display apparatus of claim 1, wherein the image display device carried out image display in synchronization with a vertical sync signal having a constant cycle; and
    the drive mechanism drives the shield member in synchronization with the vertical sync signal to carry out the shutting off of the image for the constant period.

* * * * *